US012717816B1

(12) United States Patent
Spickard et al.

(10) Patent No.: US 12,717,816 B1
(45) Date of Patent: Aug. 25, 2026

(54) USING CUSTOM FUNCTIONS TO ACCESS A CLOUD-BASED DATA WAREHOUSE

(71) Applicant: SIGMA COMPUTING, INC., San Francisco, CA (US)

(72) Inventors: Jared A. Spickard, San Francisco, CA (US); Dillon Morrison, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 188 days.

(21) Appl. No.: 18/423,646

(22) Filed: Jan. 26, 2024

(51) Int. Cl.
*G06F 16/28* (2019.01)
*G06F 16/2455* (2019.01)
*G06F 16/248* (2019.01)

(52) U.S. Cl.
CPC ........ *G06F 16/283* (2019.01); *G06F 16/2455* (2019.01); *G06F 16/248* (2019.01)

(58) Field of Classification Search
CPC ... G06F 16/283; G06F 16/2455; G06F 16/248
See application file for complete search history.

(56) References Cited

U.S. PATENT DOCUMENTS

2020/0089794 A1* 3/2020 Frantz .................... G06F 16/26
2020/0089796 A1* 3/2020 Seiden ............. G06F 16/24556
2023/0252179 A1* 8/2023 Dillon ................... G06Q 10/06
726/27

* cited by examiner

*Primary Examiner* — Courtney Harmon

(57) ABSTRACT

Using custom functions to access a cloud-based data warehouse including: receiving, by a workbook manager from a client computing system, a call to a first user-defined function input to an element of a workbook, wherein the workbook presents a dataset from a cloud-based data warehouse, wherein the first user-defined function is defined in the workbook manager; and executing, by the workbook manager and in the cloud-based data warehouse, based on the call to the first user-defined function, a second user-defined function defined in the cloud-based data warehouse.

15 Claims, 6 Drawing Sheets

USING CUSTOM FUNCTIONS TO ACCESS A CLOUD-BASED DATA WAREHOUSE

BACKGROUND

Field of the Invention

The field of the invention is data processing, or, more specifically, methods, apparatus, and products for using custom functions to access a cloud-based data warehouse.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for using custom functions to access a cloud-based data warehouse including receiving, by a workbook manager from a client computing system, a call to a first user-defined function input to an element of a workbook, wherein the workbook presents a dataset from a cloud-based data warehouse, wherein the first user-defined function is defined in the workbook manager; and executing, by the workbook manager and in the cloud-based data warehouse, based on the call to the first user-defined function, a second user-defined function defined in the cloud-based data warehouse.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
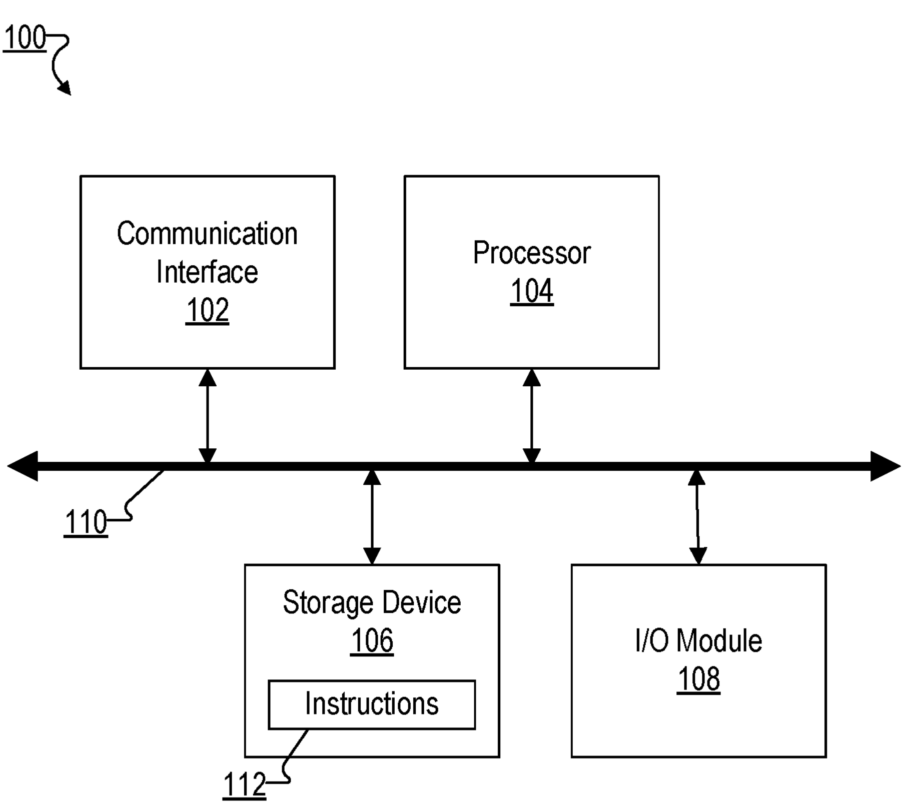
FIG. 1 sets forth a block diagram of an example system configured for using custom functions to access a cloud-based data warehouse according to embodiments of the present invention.

Example methods, apparatus, and products for using custom functions to access a cloud-based data warehouse in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
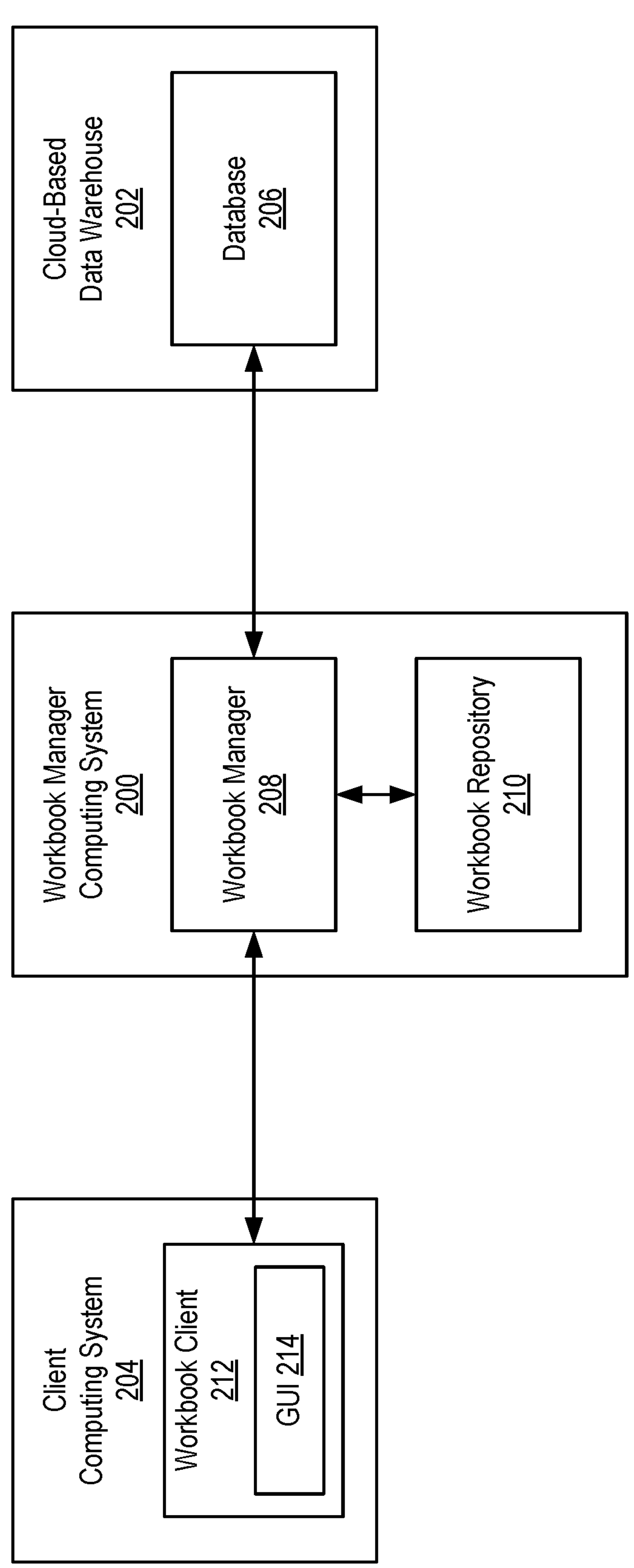
FIG. 2 sets forth a block diagram of an example system configured for using custom functions to access a cloud-based data warehouse according to embodiments of the present invention.

For further explanation, FIG. 2 illustrates a block diagram depicting an exemplary system for using custom functions to access a cloud-based data warehouse according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a client. The workbook manager 208 may reside on the workbook manager computing system 200, which is an intermediary computing system between each client computing system and the cloud-based data warehouse 202.

The cloud-based data warehouse 202 stores and manages client data on behalf of the client. The client (e.g., via the client computing system 204) accesses the data via the workbook manager 208, which organizes and analyzes the data as datasets within a workbook. The workbook manager 208 may access the client data from the cloud-based data warehouse 202 using credentials supplied by the client.

A workbook is a presentation of data from a cloud-based data warehouse 202 (e.g., using one or workbook elements). To present data from the cloud-based data warehouse 202, the data is retrieved from the database 206 (e.g., using a database statement) and organized using a dataset. A dataset is a collection of information that resides on the workbook manager computing system 200 that includes instructions for the retrieval and organization of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse. A workbook may include one or more workbook elements. Each workbook element includes a collection of graphical elements and organizing mechanism for a dataset or portion of a dataset. Workbooks may be stored in the workbook repository 210. Workbooks are described in further detail below.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212*a*, 212*b* may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
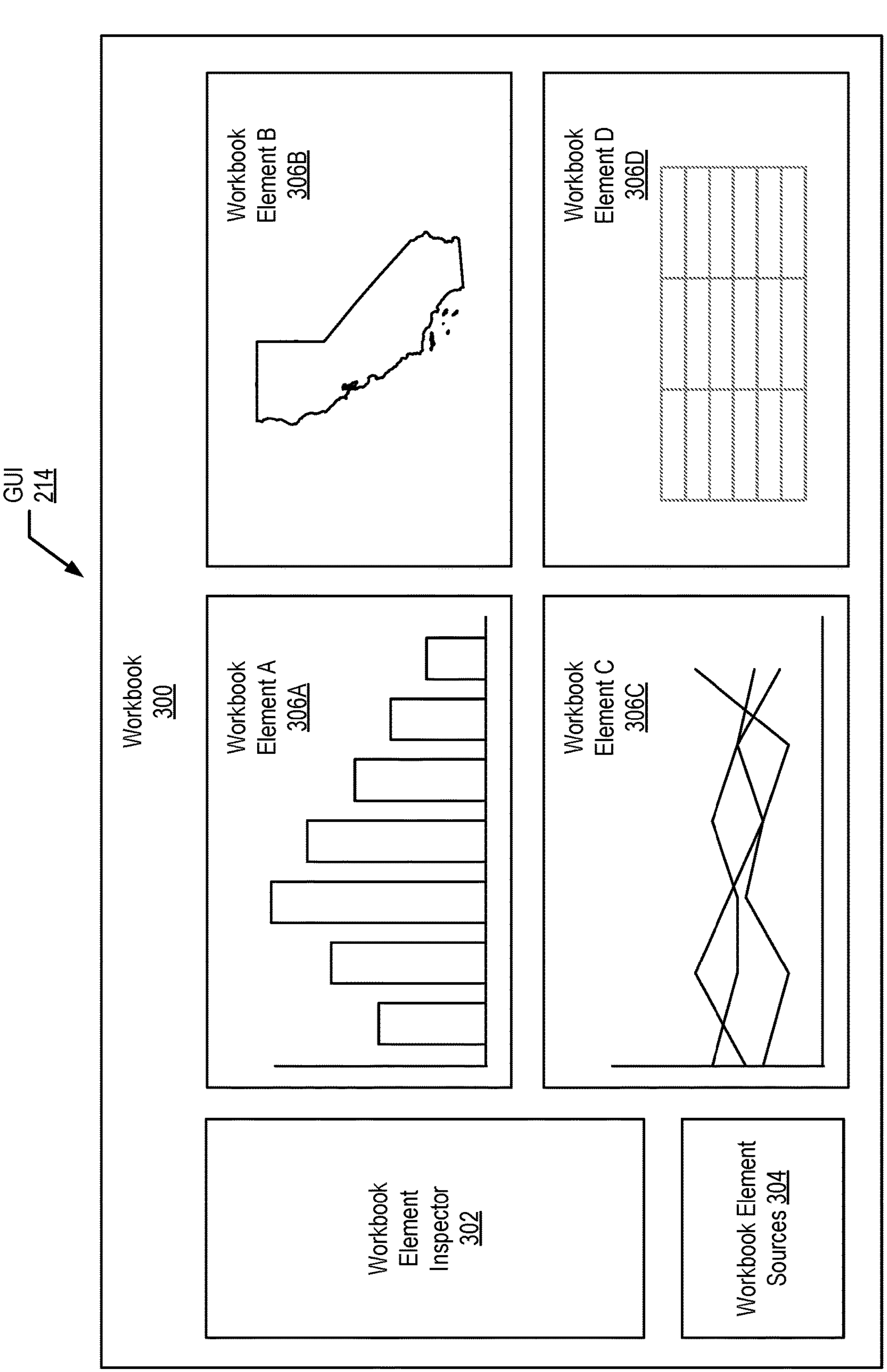
FIG. 3 sets forth a block diagram of an example system configured for using custom functions to access a cloud-based data warehouse according to embodiments of the present invention.

FIG. 3 shows an exemplary GUI for using custom functions to access a cloud-based data warehouse according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical elements that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of the of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
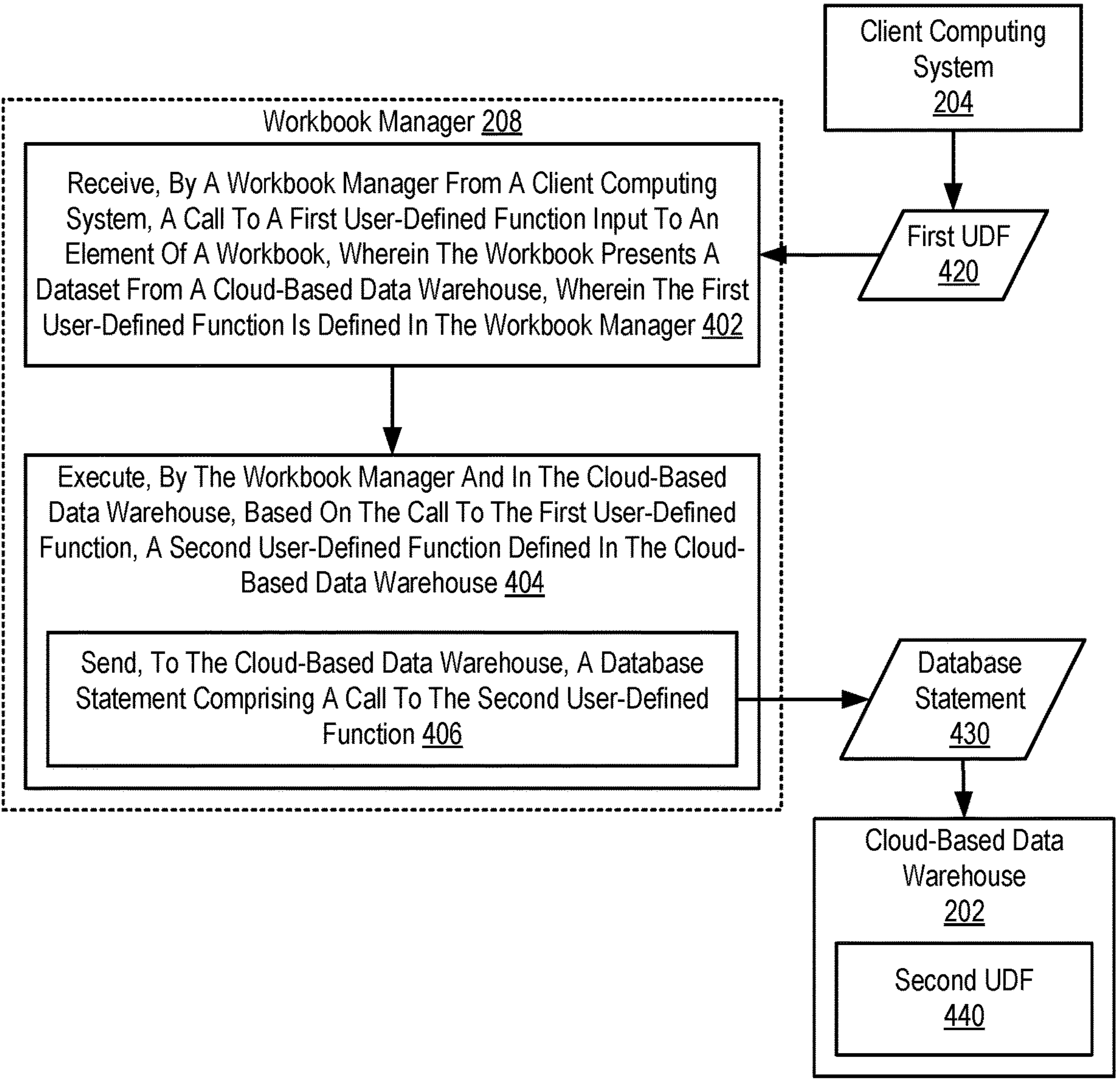
FIG. 4 sets forth a flow chart illustrating an exemplary method for using custom functions to access a cloud-based data warehouse according to embodiments of the present invention.

For further explanation, FIG. 4 sets forth a flow chart illustrating an exemplary method for using custom functions to access a cloud-based data warehouse according to embodiments of the present invention. The method of FIG. 4 may be carried out, for example, by a workbook manager 208. The method of FIG. 4 includes receiving 202, by a workbook manager 208 from a client computing system 204, a call to a first user-defined function (UDF) 420 input to an element of a workbook, wherein the workbook presents a dataset from a cloud-based data warehouse 202, wherein the first user-defined function 420 is defined in the workbook manager 208.

In contrast to a system-defined function implemented natively in some system, such as the workbook manager 208 or the cloud-based data warehouse 202, a user-defined function is a function created, defined, or provided by a user that, when executed, performs some operations or steps in the definition of the user-defined function and provide some output. In some embodiments, a user-defined function may accept one or more parameters such that the output of the user-defined function is based on the one or more parameters. Here, the first user-defined function 420 is defined in the workbook manager 208 such that calls to the first user-defined function 420 may be performed by users of the workbook manager 208. In some embodiments, the first user-defined function 420 may be defined in the workbook manager 208 in association with a particular workbook or set of workbooks such that the first user-defined function 420 may only be used by users accessing those particular workbooks. In some embodiments, the first user-defined function 420 may be defined in the workbook manager 208 in association with a particular user, group of users, organization of users and the like such that the first user-defined function 420 may be called or used by those particular users.

In the example method of FIG. 4, and as will be defined in further detail below, the definition for the first user-defined function 420 includes a reference or call to a second user-defined function 440 defined in the cloud-based data warehouse 202 such that execution of or calls to the first user-defined function 420 cause the second user-defined function 440 to be called or executed in the cloud-based data warehouse 202. User-defined functions may be defined in the workbook manager 208 using a variety of approaches, including portions of executable code, portions of compilable code, scripts, structured markup languages, structured object notations, and the like.

A user-defined function defined in the workbook manager 208 (e.g., the first user-defined function 420) may be called according to a variety of approaches. In some embodiments, a user-defined function may be called by referencing the user-defined function in some input element or input field of the workbook. For example, a cell of a spreadsheet structure or other input field may accept inputs structured in a formula notation. A formula input may include a call to the user-defined function as a function used in the formula input.

Continuing with this example, assume a user-defined function named "UDF_ONE." A formula input to a cell of a spreadsheet structure may include a formula such as "=UDF_ONE(X)+1" such that the value of the cell is equal to one plus the output of the UDF_ONE function applied to the parameter X. Accordingly, in some embodiments, receiving 402 the call to the first user-defined function 420 may include receiving an input to a workbook element that includes a formula or other reference to the user-defined function 420.

The method of FIG. 4 also includes executing 204, by the workbook manager 208 and in the cloud-based data warehouse 202, based on the call to the first user-defined function 420, a second user-defined function 440 defined in the cloud-based data warehouse 208. As is set forth above, the first user-defined function 420 is defined to include a reference to a second user-defined function 440 defined in the cloud-based data warehouse 208. Thus, when the workbook manager 208 processes the call to the first user-defined function 420 (e.g., when the workbook manager 208 processes some input that references the first user-defined function 420), a call is made to the second user-defined function 440 in the cloud-based data warehouse 202.

User-defined functions defined in the cloud-based data warehouse 202 are similar to those defined in the workbook manager 208 in that they extend the functionality of the cloud-based data warehouse 202 to include functions beyond those native to the cloud-based data warehouse 202. A call to a user-defined function defined in the cloud-based data warehouse 202 may be performed by issuing a database statement or query to the cloud-based data warehouse 202 that includes a reference or indication of the user-defined function defined in the cloud-based data warehouse 202.

Accordingly, in some embodiments, executing 204, by the workbook manager 208 and in the cloud-based data warehouse 202, based on the call to the first user-defined function 420, a second user-defined function 440 defined in the cloud-based data warehouse 208 may include sending 206, to the cloud-based data warehouse 202, a database statement 430 comprising a call to the second user-defined function 440. The database statement 430 may be encoded or structured using a query language implemented by the cloud-based data warehouse 202 such as Structured Query Language (SQL) or another query language as can be appreciated. In some embodiments, depending on the particular definition of the first user-defined function 420, one or more parameters passed to the first user-defined function 420 may be included as parameters in the call to the second user-defined function 440 (e.g., in the database statement 430). In some embodiments, the database statement 430 may be generated based on the input to the workbook that includes the call to the first user-defined function 420. For example, the database statement 430 may be generated based on a formula input or other input such that the response to the database statement 430 reflects the output or result of the processed formula. Accordingly, in some embodiments, the database statement 430 may include additional steps, calls, functions, and the like in addition to a call to the second user-defined function 440.

Continuing with the example above, assume that the definition of the first user-defined function 420 UDF_ONE calls a second user-defined function 440 UDF_TWO defined in the cloud-based data warehouse 202. Further assume that a formula input to a workbook element includes the formula "=UDF_ONE(X)+1." Here, processing this formula input by the workbook manager 208 may cause a database statement 430 such as "SELECT UDF_TWO(X)" to be sent to the cloud-based data warehouse 202. The cloud-based data warehouse 202 may then process the database statement 430 using the definition for UDF_TWO as stored in the cloud-based data warehouse 202. A response to this database statement 430 would then be treated as the output for the UDF_ONE function in the formula. Accordingly, the formula output is effectively the output of UDF_TWO(X) increased by one, with UDF_TWO being called using a user-defined function in the workbook manager 208 UDF_ONE.

Existing solutions for user-defined functions in cloud-based data warehouses or other databases allow for extension of the warehouse or database functionality. However, as these user-defined functions must be called using the query language of the warehouse or database, users can only use these functions using clients that directly connect to the database or warehouse and allow users to input their own database statements or queries. Intermediary systems such as a workbook manager 208 allow for users to interact with or present data stored in cloud-based data warehouses without requiring the user to manually input their own database statements or queries. Accordingly, the user-defined functions defined in the cloud-based data warehouse 202 would be unavailable to users of the workbook manager 208 unless they were called using system-native functions of the workbook manager 208. Instead, the approaches set forth herein allow for the creation of user-defined functions in the workbook manager 208 that call or reference user-defined functions defined in the cloud-based data warehouse 202. This allows for users to access or call the user-defined functions of the cloud-based data warehouse 202 using formula notation or other non-query inputs to a workbook.

Figure 5:
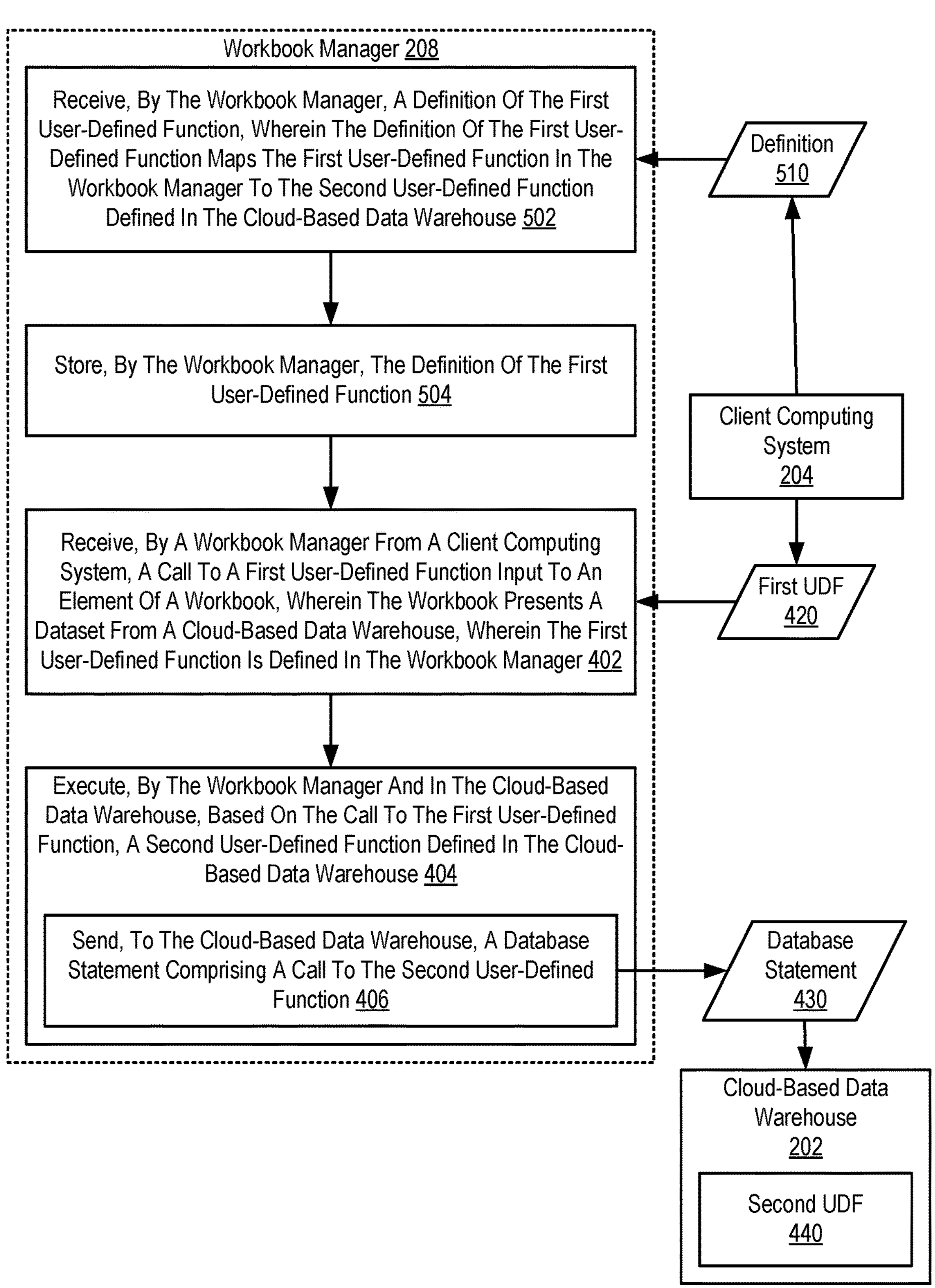
FIG. 5 sets forth a flow chart illustrating an exemplary method for using custom functions to access a cloud-based data warehouse according to embodiments of the present invention.

For further explanation, FIG. 5 sets forth a flowchart of an example method of using custom functions to access a cloud-based data warehouse in accordance with some embodiments of the present disclosure. The method of FIG. 5 is similar to FIG. 4 in that the method of FIG. 5 also includes: receiving 202, by a workbook manager 208 from a client computing system 204, a call to a first user-defined function 420 input to an element of a workbook, wherein the workbook presents a dataset from a cloud-based data warehouse 202, wherein the first user-defined function 420 is defined in the workbook manager 208; and executing 204, by the workbook manager 208 and in the cloud-based data warehouse 202, based on the call to the first user-defined function 420, a second user-defined function 440 defined in the cloud-based data warehouse 208, including: sending 206, to the cloud-based data warehouse 202, a database statement 430 comprising a call to the second user-defined function 440.

The method of FIG. 5 differs from FIG. 4 in that the method of FIG. 5 also includes: receiving 502, by the workbook manager 208, a definition 510 of the first user-defined function 420, wherein the definition 510 of the first user-defined function 420 maps the first user-defined function 420 in the workbook manager 208 to the second user-defined function 440 defined in the cloud-based data warehouse 220. The definition 510 of the first user-defined function 420 maps the first user-defined function 420 in the workbook manager 208 to the second user-defined function 440 defined in the cloud-based data warehouse 220 in that the definition of the first user-defined function 420 includes a reference or identification of the second user-defined function 440 such that, as described above, processing a call to the first user-defined function 420 causes a database statement 430 to be generated that executes or calls the second user-defined function 440 in the cloud-based data warehouse 202.

The method of FIG. 5 also includes storing 504, by the workbook manager 208, the definition of the first user-defined function 420. As an example, the definition 510 of the first user-defined function 420 may be stored as a binding, macro, or shortcut that maps the first user-defined function 420 to the second user-defined function 440. As another example, the definition 510 of the first user-defined function 420 may be stored as a script, structured data, or other data processable by the workbook manager 208 that encodes a mapping or relationship between the first user-defined function 420 to the second user-defined function 440.

Figure 6:
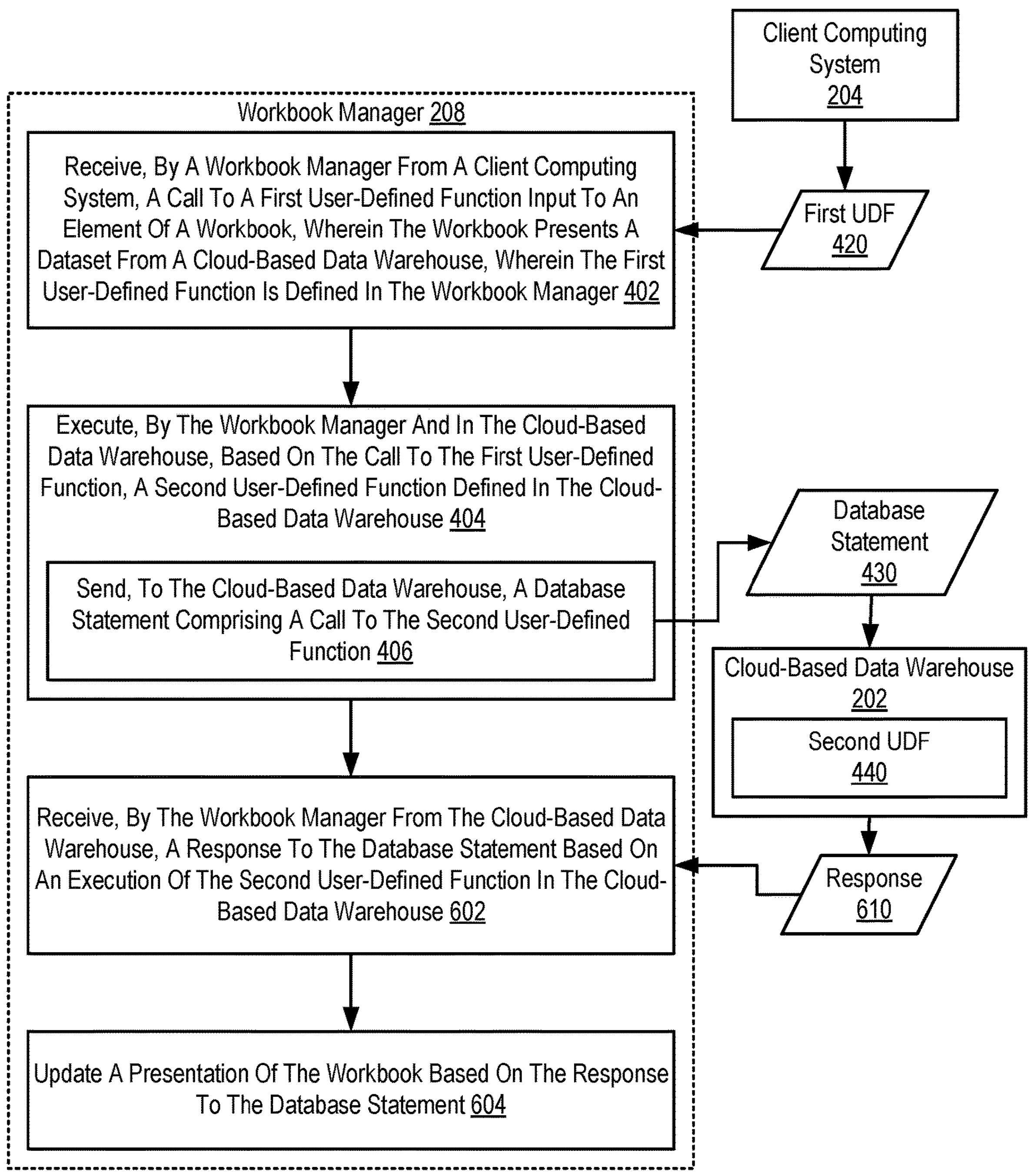
FIG. 6 sets forth a flow chart illustrating an exemplary method for using custom functions to access a cloud-based data warehouse according to embodiments of the present invention.

For further explanation, FIG. 6 sets forth a flowchart of an example method of using custom functions to access a cloud-based data warehouse in accordance with some embodiments of the present disclosure. The method of FIG. 5 is similar to FIG. 4 in that the method of FIG. 5 also includes: receiving 202, by a workbook manager 208 from a client computing system 204, a call to a first user-defined function 420 input to an element of a workbook, wherein the workbook presents a dataset from a cloud-based data warehouse 202, wherein the first user-defined function 420 is defined in the workbook manager 208; and executing 204, by the workbook manager 208 and in the cloud-based data warehouse 202, based on the call to the first user-defined function 420, a second user-defined function 440 defined in the cloud-based data warehouse 208, including: sending 206, to the cloud-based data warehouse 202, a database statement 430 comprising a call to the second user-defined function 440.

The method of FIG. 6 differs from FIG. 4 in that the method of FIG. 6 also includes receiving 602, by the workbook manager 208 from the cloud-based data warehouse 202, a response 610 to the database statement 430 based on an execution of the second user-defined function 440 in the cloud-based data warehouse 202. The response 610 may include an output or result of executing the second user-defined function 440 in the cloud-based data warehouse 202. The response 610 may also reflect other steps, functions, or operations performed in the cloud-based data warehouse 202 based on the database statement 430, such as where the call to the second user-defined function 440 is one of many operations or functions included in the database statement 430.

The method of FIG. 6 also includes updating 604 a presentation of the workbook based on the response 610 to the database statement 430. For example, the response 610 or a portion of the response 610 may be presented via one or more workbook elements. As another example, one or more other functions or operations may be applied to the response 610 or to components of the response 610 prior to presentation via the one or more workbook elements. As an example, a formula input to a workbook element may be processed or calculated based on the response 610 or a component of the response 610 used as a parameter in the formula.

In view of the explanations set forth above, readers will recognize that the benefits of using custom functions to access a cloud-based data warehouse according to embodiments of the present invention include:

Improving the operation of the computer system by enabling access to user-defined functions defined in a cloud-based data warehouse without directly querying the cloud-based data warehouse, increasing system utility.

Exemplary embodiments of the present invention are described largely in the context of a fully functional computer system for using custom functions to access a cloud-based data warehouse. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for using custom functions to access a cloud-based data warehouse, the method comprising:

receiving, by a workbook manager from a client computing system, a call to a first user-defined function input to an element of a workbook, wherein the workbook presents a dataset from a cloud-based data warehouse, wherein the first user-defined function is defined in the workbook manager and provided by a user that, when executed, performs operations in a definition of the first user-defined function and provides output; and executing, by the workbook manager and in the cloud-based data warehouse, based on the call to the first user-defined function, a second user-defined function defined in the cloud-based data warehouse, wherein executing the second user-defined function comprises sending, to the cloud-based data warehouse, a database statement comprising a call to the second user-defined function, and wherein the database statement comprises a structured query language (SQL) statement.

2. The method of claim 1, wherein the call to the second user-defined function comprises one or more parameters of the first user-defined function.

3. The method of claim 1, further comprising receiving, by the workbook manager from the cloud-based data warehouse, a response to the database statement based on an execution of the second user-defined function in the cloud-based data warehouse.

4. The method of claim 3, further comprising updating a presentation of the workbook based on the response to the database statement.

5. The method of claim 1, further comprising receiving, by the workbook manager, a definition of the first user-defined function, wherein the definition of the first user-defined function maps the first user-defined function in the workbook manager to the second user-defined function defined in the cloud-based data warehouse.

6. The method of claim 5, further comprising storing, by the workbook manager, the definition of the first user-defined function.

7. The method of claim 1, wherein the element of the workbook comprises a formula input element and wherein the call to the first user-defined function comprises a function in a formula input to the formula input element.

8. An apparatus for using custom functions to access a cloud-based data warehouse, the apparatus comprising a computer processor, a computer memory operatively coupled to the computer processor, the computer memory having disposed within it computer program instructions that, when executed by the computer processor, cause the apparatus to carry out:

receiving, by a workbook manager from a client computing system, a call to a first user-defined function input to an element of a workbook, wherein the workbook presents a dataset from a cloud-based data warehouse, wherein the first user-defined function is defined in the workbook manager and provided by a user that, when executed, performs operations in a definition of the first user-defined function and provides output; and executing, by the workbook manager and in the cloud-based data warehouse, based on the call to the first user-defined function, a second user-defined function defined in the cloud-based data warehouse, wherein executing the second user-defined function comprises sending, to the cloud-based data warehouse, a database statement comprising a call to the second user-defined function, and wherein the database statement comprises a structured query language (SQL) statement.

9. The apparatus of claim 8, wherein the call to the second user-defined function comprises one or more parameters of the first user-defined function.

10. The apparatus of claim 8, wherein the computer program instructions further cause the apparatus to carry out the step of receiving, by the workbook manager from the cloud-based data warehouse, a response to the database statement based on an execution of the second user-defined function in the cloud-based data warehouse.

11. The apparatus of claim 10, wherein the computer program instructions further cause the apparatus to carry out the step of updating a presentation of the workbook based on the response to the database statement.

12. The apparatus of claim 8, wherein the computer program instructions further cause the apparatus to carry out the step of receiving, by the workbook manager, a definition of the first user-defined function, wherein the definition of the first user-defined function maps the first user-defined function in the workbook manager to the second user-defined function defined in the cloud-based data warehouse.

13. The apparatus of claim 12, wherein the computer program instructions further cause the apparatus to carry out the step of storing, by the workbook manager, the definition of the first user-defined function.

14. The apparatus of claim 8, wherein the element of the workbook comprises a formula input element and wherein the call to the first user-defined function comprises a function in a formula input to the formula input element.

15. A computer program product for using custom functions to access a cloud-based data warehouse, the computer program product disposed upon a non-transitory computer readable storage medium, the computer program product comprising computer program instructions that, when executed, cause a computer to carry out:

receiving, by a workbook manager from a client computing system, a call to a first user-defined function input to an element of a workbook, wherein the workbook presents a dataset from a cloud-based data warehouse, wherein the first user-defined function is defined in the workbook manager and provided by a user that, when executed, performs operations in a definition of the first user-defined function and provides output; and executing, by the workbook manager and in the cloud-based data warehouse, based on the call to the first user-defined function, a second user-defined function defined in the cloud-based data warehouse, wherein executing the second user-defined function comprises sending, to the cloud-based data warehouse, a database statement comprising a call to the second user-defined function, and wherein the database statement comprises a structured query language (SQL) statement.

* * * * *